United States Patent
Remskar et al.

(10) Patent No.: US 8,496,907 B2
(45) Date of Patent: Jul. 30, 2013

(54) PROCEDURE FOR THE SYNTHESIS OF THREADLIKE TUNGSTEN OXIDE $W_5O_{14}$

(75) Inventors: Maja Remskar, Grosuplje (SI); Marko Virsek, Grosuplje (SI); Miha Kocmur, Ljubljana (SI); Adolf Jesih, Planina (SI)

(73) Assignee: Institut "Jozef Stefan", Ljubljana (SI)

( * ) Notice: Subject to any disclaimer, the term of this patent is extended or adjusted under 35 U.S.C. 154(b) by 616 days.

(21) Appl. No.: 12/528,162

(22) PCT Filed: Feb. 22, 2008

(86) PCT No.: PCT/SI2008/000011
§ 371 (c)(1),
(2), (4) Date: Dec. 29, 2009

(87) PCT Pub. No.: WO2008/105745
PCT Pub. Date: Sep. 4, 2008

(65) Prior Publication Data
US 2012/0156127 A1    Jun. 21, 2012

(30) Foreign Application Priority Data

Feb. 26, 2007    (SI) .................................. 200700045

(51) Int. Cl.
*C01G 41/02*    (2006.01)
(52) U.S. Cl.
USPC ........................................................ 423/606
(58) Field of Classification Search
USPC ........................................................ 423/606
See application file for complete search history.

(56) References Cited

U.S. PATENT DOCUMENTS

2004/0105808 A1 * 6/2004 Tenne et al. ................. 423/561.1
2009/0268371 A1 * 10/2009 Hishitani et al. .............. 361/305

OTHER PUBLICATIONS

Thommy Ekström, R.J.D. Tilley, "Ternary Tungsten Oxides with the Mo5O14 Structure," copyright 1976, Journal of Solid State Chemistry, vol. 19, pp. 125-133, Academic Press, Inc., Great Britain.
International Search Report mailed on Sep. 1, 2008 in PCT/SI2008/000011.
I.J. McColm, R. Steadman, and S.J. Wilson, "Iron-Promoted Phases in the Tungsten-Oxygen System," copyright 1978, Journal of Solid State Chemistry, vol. 23, pp. 33-42, Academic Press, Inc., Great Britain.
Maja Remškar et al., "W5O14 Nanowires," copyright 2007, Advanced Functional Materials, vol. 17, pp. 1974-1978, Wiley-VCH Verlag GmbH & Co. CGaA, Weinheim, Germany.
U.S. Appl. No. 12/593,522, filed Sep. 28, 2009, Mrzel et al.
Written Opinion mailed on Sep. 1, 2008 in PCT/SI2008/000011.

* cited by examiner

*Primary Examiner* — Steven Bos
(74) *Attorney, Agent, or Firm* — Stanislav Antolin

(57) ABSTRACT

The object of the invention is the synthesis of threadlike tungsten oxide $W_5O_{14}$, in the presence of nickel at a temperature lower than 1000° C. Represented is a procedure for the synthesis of a highly homogeneous phase of the $W_5O_{14}$ compound from the vapor phase, in the presence of nickel, by means of a chemical transport method in a closed quartz ampoule. As an alternative example, a procedure is represented for the synthesis of the $W_5O_{14}$ compound in a through-flow reaction vessel. Both procedures yield electrically conductive threadlike crystals of the $W_5O_{14}$ compound. The synthesis is performed in vapor phase. Tungsten enters the reaction as a pure phase or via $WS_{2\pm x}$, $x \approx 4$, previously synthesized from the elements, and/or the source of tungsten may also be tungsten oxides $WO_{3-y}$, $0 \leq y \leq 1$. Nickel may enter the reaction via $NiI_2$, $Ni(OH)_2$ and/or atomic nickel.

18 Claims, 4 Drawing Sheets

PROCEDURE FOR THE SYNTHESIS OF THREADLIKE TUNGSTEN OXIDE $W_5O_{14}$

Figure 1:
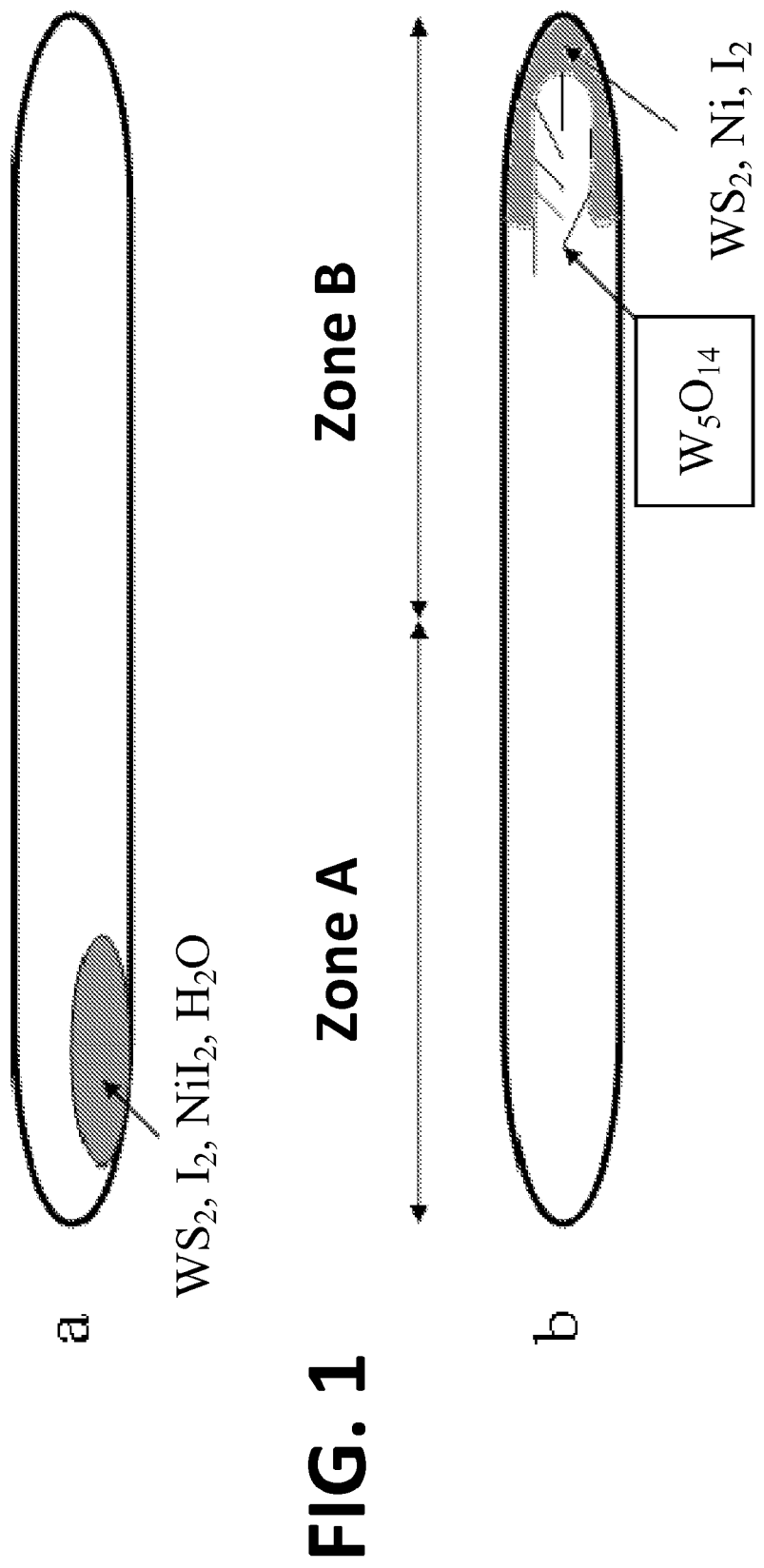

This application is a national stage application under 35 U.S.C. 371 of international application No. PCT/SI2008/000011 filed 22 Feb. 2008, and claims priority to Slovenian Application No. P-200700045 filed 26 Feb. 2007, the disclosure of which is expressly incorporated herein by reference.

TECHNICAL FIELD OF THE INVENTION

The present invention relates to a procedure for the synthesis of threadlike tungsten oxide $W_5O_{14}$ in the presence of nickel at temperatures lower than 1000° C. The procedure enables the synthesis of electrically conductive tungsten oxides having rodlike or threadlike forms. The present invention relates to the field of chemical technology, more specifically, to inorganic chemistry, of tungsten oxides obtained in the form of nanostructures by means of physico-chemical processing.

STATE OF THE ART $W_5O_{14}$ appertains to Magneli phases of the general formula $W_nO_{3n-1}$, which are characterized by the mixing of different oxide phases at high values of the n number. In the past, a single-phase material was successfully synthesized, for the first time, in the presence of small amounts of iron, which were so minute that they were not detectable in the final material. (I. J. McColm, R. Steadman, and S. J. Wilson, J. Solid State Chem. 23, 33 (1978). The $W_5O_{14}$ phase was composed of violet blue fibers only after a comparatively long heating period—one week at 1100° C. A prolonged heating period (4 weeks) yielded finer fibers of the same phase. Determined was a tetragonal basic crystal cell having parameters: a=2.333±0.001 nm, c=0.3797±0.0001 nm, and the space group $P42_1m$. The structure was explained by pentagonal and hexagonal tunnels surrounded by pentagonal small columns of $WO_6$. The existence of the $W_5O_{14}$ phase in the otherwise multi-phase material was reported also in association with the synthesis in the presence of Li, Na, K, Rb, Cs, Mg, Ba, Mn, Fe, Cu, Zn, Cd, Hg, Ge, Sn, Pb, and Bi. (T. Ekström and R. J. D. Tilley, J. Solid State Chem. 19, 125 (1976)). Recently, the $W_5O_{14}$ phase was found also inside particular $WS_2$ fullerene structures after the sulfurization of $WO_{3-x}$ precursor crystals (J. Sloan, J. L. Hutchison, R. Tenne, Y. Feldman, T. Tsirlina, and M. Homyonfer, J. Solid State Chem. 144, 100 (1999)). In thin layers, this phase was indicated as less probable (N. E. Stankova, P. A. Atanasov, T. J. Stanimirova, and A. Og. Dikovska), or only as a possible phase in the synthesis of substoichiometric tungsten oxides in laser deposition of $WO_3$ (M. Kurumada, O. Kido, K. Kamitsuji, Y. Kimura, T. Sato, H. Suzuki, Y. Saito, C. Kaito). No reports are available on the synthesis of the $W_5O_{14}$ phase in the presence of nickel, except for the notice concerning an unsuccessful experiment (T. Ekström and R. J. D. Tilley, J. Solid State Chem. 19, 125 (1976)).

The search performed in Japanese, European and American patent bases and publications since 1970, revealed no known or disclosed procedure for the synthesis of rodlike and threadlike crystals of $W_5O_{14}$ in the presence of nickel.

TECHNICAL PROBLEM

Tungsten oxides of nanometric dimensions of the chemical formula $WO_{3-x}$ are applicable in gas sensors (J. L. Solis, S. Saukko, L. Kish, C. G. Granqvist, and V. Lantto, Thin Solid Films 391, 255 (2001)). They enhance the photochromic effect (S. T. Li and M. S. EI-Shall, Nanostruct. Mater. 12, 215 (1999)); they may be utilized as electron source in field emission (Y. B. Li, Y. Bando, D. Goldberg, Adv. Mater. 15, 1294 (2003), especially $W_{18}O_{49}$ nanowires. Besides, the use of $WO_{3-x}$ threadlike crystals, as starting material, is important for the synthesis of $WS_2$ nanotubes by means of sulfurization in a $H_2S$ containing gas mixture stream (R. Tenne, A. Rothschild, and M. Homyonfer, U.S. Pat. No. 6,841,142 B1, January, 2005). The monoclinic $W_{18}O_{49}$ phase has the greatest oxygen deficiency of all substoichiometric $WO_{3-x}$ ($x \leq 1$) crystals. It is the only phase, which may be synthesized as a pure phase without the admixture of other tungsten oxides (J. Booth, T. Ekströ, E. Iguchi, and R. J. D. Tilley, J. Solid State Chem. 41, 193 (1982)). In all other substoichiometrics, the very phase mixtures represent problems in establishing utilization of tungsten substoichiometric crystals, and influence the measurement of physical and chemical characteristics, as well as the quality of reaction products, such as the $WS_2$ fullerene structures.

The technical problem, which has not been sufficiently solved as yet, is therefore the synthesis of a highly homogenous $W_5O_{14}$ phase in rodlike and threadlike form.

The task and the object of the present invention comprise the synthesis of a highly homogenous $W_5O_{14}$ phase in rodlike and threadlike form.

According to the present invention the said object is achieved by means of a procedure for the synthesis of rodlike and threadlike crystals of $W_5O_{14}$ in the presence of nickel at temperatures lower than 1000° C.

DESCRIPTION OF THE SOLUTION OF THE PROBLEM

The said object is achieved according to the present invention by means of a method for the synthesis of the $W_5O_{14}$ phase in the presence of nickel. The synthesis is feasible by means of a chemical transport reaction in a closed quartz ampoule or by a reaction in a through-flow reaction vessel. The synthesis is carried out in vapor phase. Tungsten enters the reaction as a pure phase or via $WS_{2\pm x}$, $x \approx 4$, previously synthesized from the elements. The possible source of tungsten is also tungsten oxides $WO_{3-y}$, $0 \leq y \leq 1$. Nickel may enter the reaction via $NiI_2$, $Ni(OH)_2$ or atomic nickel.

Figure 2:
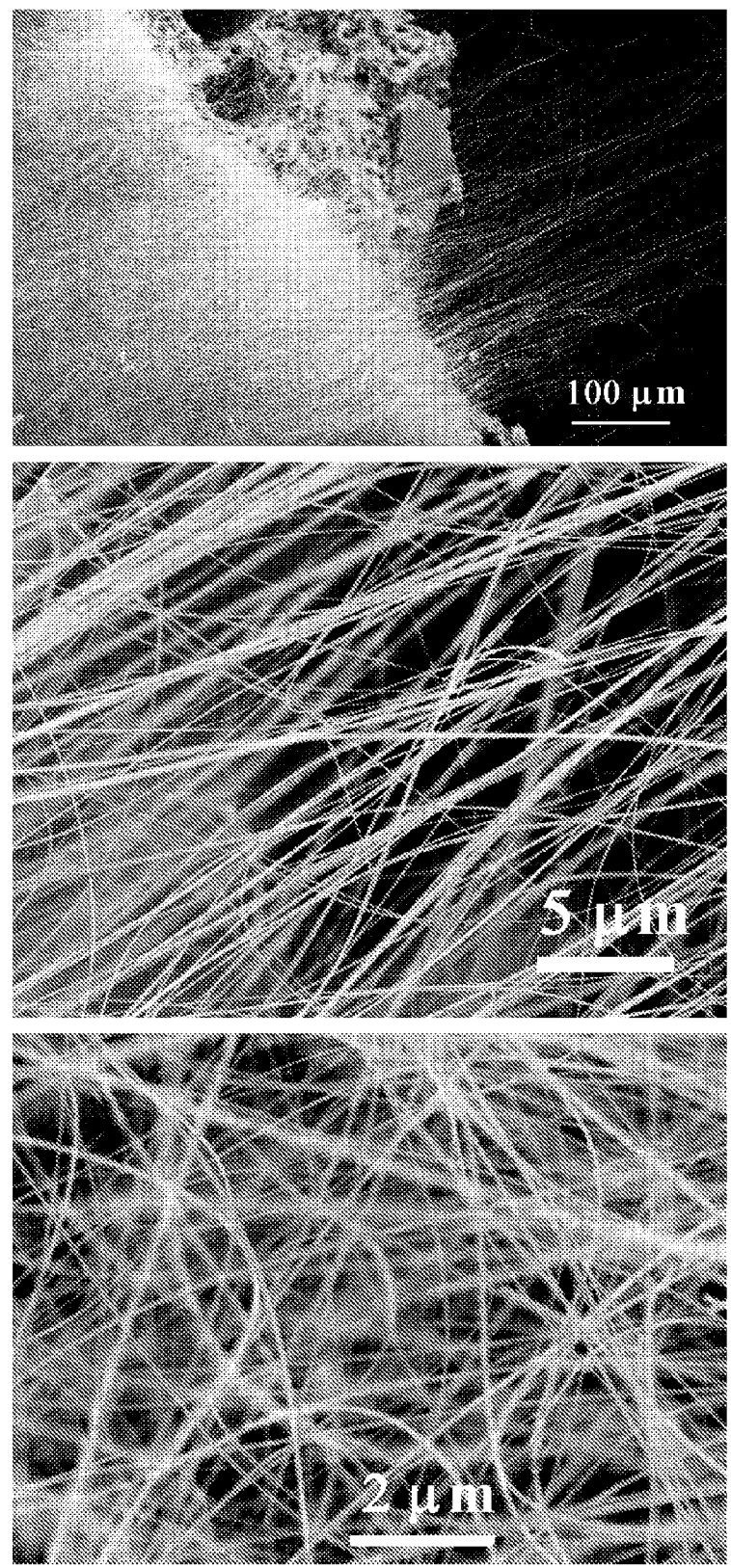
Figure 3:
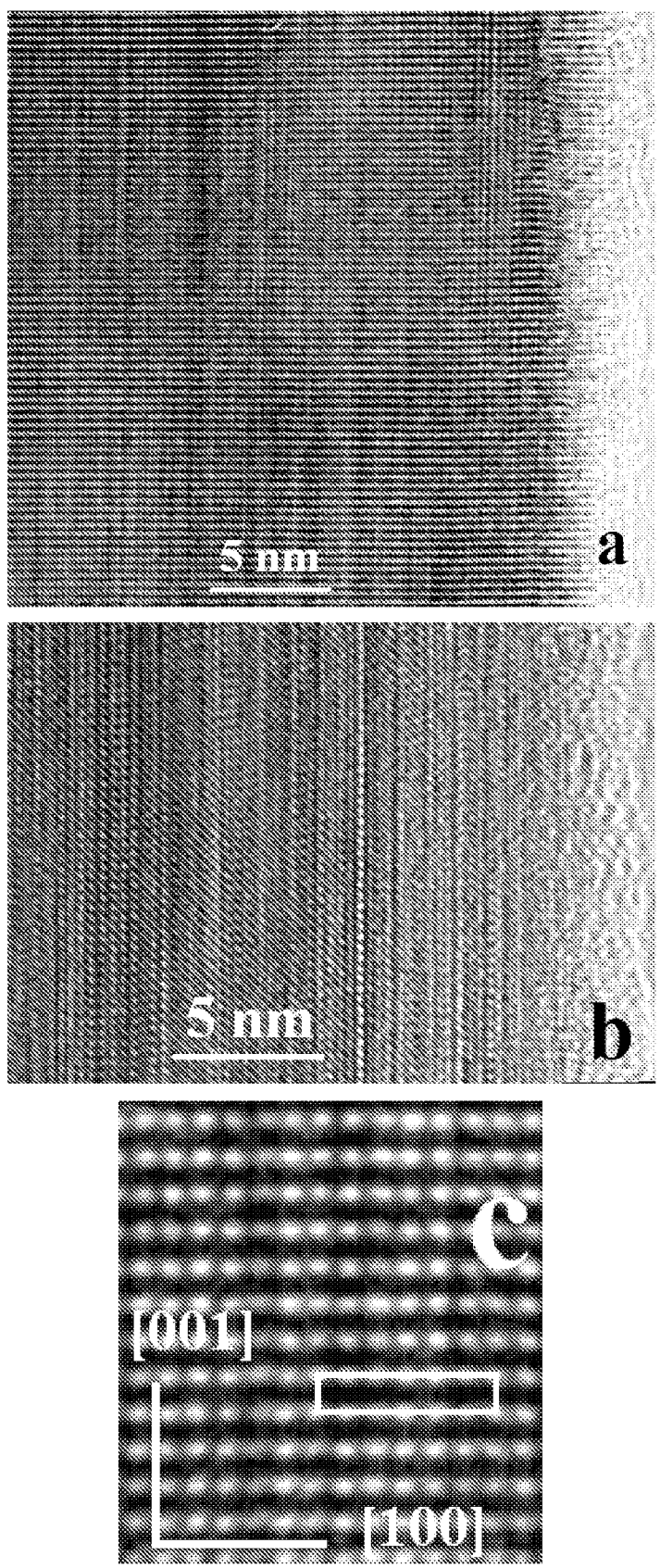
Figure 4:
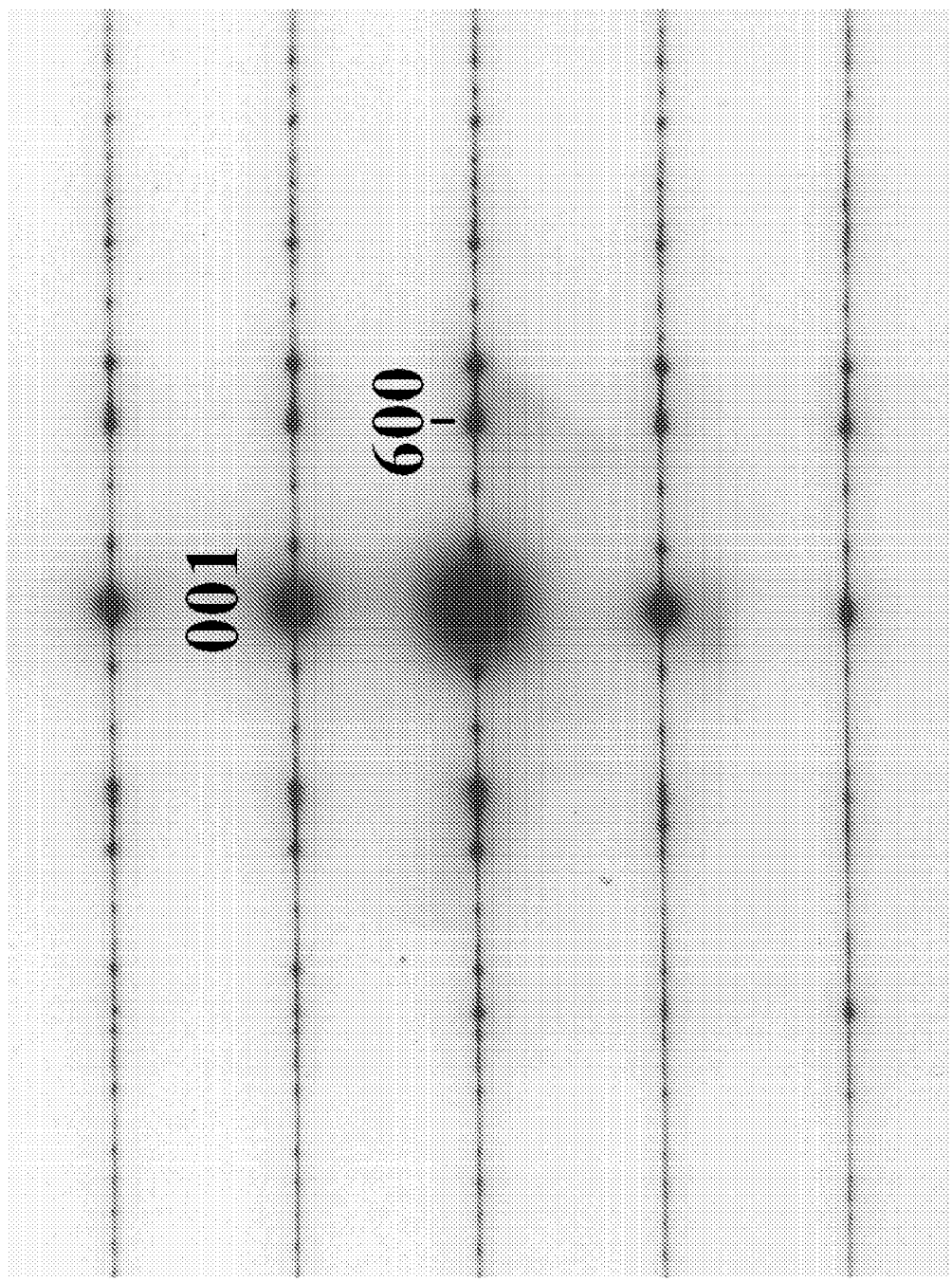

The invention is illustrated by the following Examples and Figures representing:

FIG. 1: Schematic representation of a quartz ampoule prior to the transport reaction (a.), and subsequent to the transport reaction (b.), FIG. 2: Electron microscope images (SEM) of threadlike and rodlike oxides $W_5O_{14}$ on a $WS_2$ substrate. The image was taken by a high-resolution field emission microscope (FE-SEM, Supra 35 VP, Carl Zeiss), FIG. 3: High-resolution electron microscope image (HR-TEM) of the $W_5O_{14}$ crystal shows atomic planes (001)-(a), planes (100)-(b) and [010] plane-(c), FIG. 4 shows the electron diffraction (TED) on a $W_5O_{14}$ crystal. The direction of the electron beam was parallel to the direction [010] of the crystal. FIGS. 3 and 4 were taken by means of a high-resolution transmission electron microscope JEM-2010F.

EXAMPLE 1

Synthesis of a Highly Homogenous $W_5O_{14}$ Phase in the Presence of Nickel by Means of Chemical Transport Reaction in a Closed Quartz Ampoule The compound $W_5O_{14}$ of highly homogenous stoichiometry was synthesized in conformance with the iodine transport method, which is a standard method for the synthesis of layered crystals of transition metal dichalcogenides (R. Nitsche, J. Phys. Chem. Solids, 17, 163 (1960). Specific conditions of the iodine transport reaction yield in addition to layered crystals $WS_2$ and $WO_2$ also threadlike and rodlike $W_5O_{14}$ crystals. Hitherto, such a transport method has not been used in association with the synthesis of tungsten oxides.

The chemical transport reaction is based on the fact that in a system, in which the solid substance is in balance with several vapor components, a material transfer is caused by variation of the system balance; for example, in the case of the existence of a certain temperature gradient (R. Nitsche, J. Phys. Chem. Solids, 17, 163 (1960)). The reaction was carried out in an evacuated quartz ampoule having a length of 20 cm, and an inner diameter of 20 mm. At one end this ampoule was fed with the previously synthesized compound $WS_2$ (0.6 (1±0.01) g), iodine ($I_2$)(0.2 (1±0.01) g), $H_2O$ (20 µg±5 µg) and $NiI_2$ (0.068 (1±0.01) g). The reaction was performed in a two-zone oven. The part of the quartz ampoule containing the input material was in the higher temperature region. On the higher temperature side (860° C.) were, in vapor phase, the compounds ($I_2$)$NiI_2$, $H_2O$ and sulfur. Tungsten was transported with the aid of iodine to the cooler end part of the ampoule (736° C.) (FIG. 1, zone B), resulting in the growth of $WS_2$ and $W_5O_{14}$. The released iodine was reused in the transport. The role of nickel has not been explained as yet. It was proven, however, that the $W_5O_{14}$ phase did not grow in the absence of nickel. Possible is a catalytic action of nickel, and an accelerated diffusion of tungsten ("growth promoter") through $Ni(OH)_2$, which enables a fast longitudinal growth of the crystals $W_5O_{14}$. In the course of the transport reaction may be formed $Ni(OH)_2$, $NiSO_4$ or various $NiS_z$ compounds. Subsequently to the reaction, only the presence of the $Ni(OH)_2$ phase was confirmed by photoelectron spectroscopy. Oxygen deficiency in the crystals with regard to $WO_3$ is due to the reducing reaction, in the course of the reaction of the generated gas $H_2S$ or $H_2$ respectively.

Chemical reactions during the synthesis of $W_5O_{14}$ by means of a transport reaction are as follows:

$$W + 5H_2O + NiI_2 \rightarrow WO_3 + 4H_2 + Ni(OH)_2 + I_2 \quad (a)$$

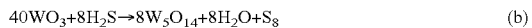

$$40 WO_3 + 8H_2S \rightarrow 8W_5O_{14} + 8H_2O + S_8 \quad (b)$$

$$4W + S_8 \rightarrow 4WS_2 \quad (c)$$

EXPERIMENT

1. Preparation of a quartz ampoule representing a closed reaction vessel in which the reaction is carried out An ampoule (length 20 cm, inner diameter 20 mm) having a narrow neck at one end, to facilitate the sealing, was previously cleaned with acetone in an ultrasonic cleaner, followed by drying for 15 minutes in a dryer at 80° C. Into the ampoule were weighted 0.6 (1±0.01) g of $WS_2$, 0.2 (1±0.01) g of iodine ($I_2$), 20 µg±5 µg of distilled water ($H_2O$), and 0.068 (1±0.01) g of $NiI_2$. In between the feeding of the individual components into the ampoule the latter was coated with a paraffin film. The ampoule was then coupled to a vacuum system, and immersed in a Dewar flask containing liquid nitrogen. After the attained pressure of $4.10^{-3}$ mbar (with a diffusion pump) the valve on one of the ampoules was slightly opened, thus raising the pressure to $8.10^{-3}$ mbar. After further pumping for about 1.5 h, a pressure of $4.5\ 0.10^{-3}$ mbar was attained. The ampoule was then sealed and inserted in a three-zone oven LINDBERG STF 55346C.

2. Thermal cleaning

The ampoule was heated, so that the temperature in zone B was kept all the time higher than in zone A. Thus, the zone B was cleaned. The heating in this step was performed within 24 hours at a rate of 0.61° C./min, up to a temperature of 900° C. in zone B, wherein the growth of crystals of the transported material was achieved, and at a rate of 0.59° C./min up to 875° C. in zone A. Both zones attained simultaneously the said temperatures. The cooling started after 6 hours. The zone A was cooled in steps of 0.02° C./min to a temperature of 860° C., and the zone B in steps of 0.23° C./min to a temperature of 736° C.

3. Material transport and cooling of the ampoule

The material transport between the zone A and the zone B took 200 hours. It was followed by a gradual cooling of the ampoule to 30° C. in steps of 0.58° C./min in zone A, and in steps of 1° C./min in zone B. The temperature of 30° C. was reached, followed by an uncontrolled cooling of the ampoule to room temperature in a few hours.

4. Synthesis results

Transported was more than 95% of the input material. The transported material was accumulated on the ampoule walls, approximately 18-19 cm from the beginning of zone A, in zone B (FIG. 1). Rodlike and threadlike $W_5O_{14}$ crystals were on the surface of transported $WS_2$ crystals at the extreme end of zone B. After the breaking of the ampoule iodine sublimated at the extreme end of zone B, and a deep blue region appeared in a diameter of approximately 1 cm. In the center the material was of a deeper blue color; there grew in addition to fine crystals also several longer, thicker and brittle crystals. Around was the material light blue, composed of fine rodlike and threadlike $W_5O_{14}$ crystals. The light blue region was very homogeneous and pure. The $W_5O_{14}$ crystals were separated mechanically—by scrapping from the surface of the $WS_2$ substance.

EXAMPLE 2

Synthesis in a Through-Flow Reaction Vessel Using an Induction Oven

The synthesis was carried out in an induction oven, by means of heating a graphite crucible in a high-frequency magnetic field, generated with a six-loop coil wound around the reactor, through which flows a radio-frequency (RF) current having a frequency of 710 kHz. The reactor consists essentially of a quartz tube having a diameter of 45 mm, which is connected to a vacuum pump enabling the evacuation. Besides, a gas flow may be established through the tube. The graphite crucible is in the center of the reactor and is positioned on a quartz projection. The temperature of the graphite crucible was measured with a thermocouple, which was previously calibrated by means of an optical pyrometer. The input material was fed into a molybdenum crucible having a bottom plane surface of about 1 cm². The molybdenum crucible was inserted into the graphite crucible. It was estimated that the temperature of the molybdenum crucible and the input material were identical with the temperature of the graphite crucible. The input material contained 0.05 g of previously synthesized $WS_2$ and 0.02 g of Ni in the form of short pieces of a 0.15 mm thick wire. At first, the crucible was evacuated to 0.25 mbar. Then a flow of about 320 L/h of $N_2$ was established, which was humidified by passage through water at room temperature. The graphite crucible was heated, at an approximately constant heating rate, within 20 minutes, from room temperature to a final temperature within the range of 800-950° C. It was kept at this temperature for 15 minutes, then the RF current was switched off, and the graphite crucible was left to cool uncontrolled to room temperature. Within two minutes, the temperature of the graphite crucible decreased to 500° C., and then it cooled uncontrolled to room temperature. The transport was performed by means of the carrier gas $N_2$. At working temperatures in the range of 800-950° C., sulfur was emitted from $WS_2$, and tungsten reacted with the oxygen originating from the water vapor, which was drawn into the reactor by nitrogen. Nickel reacts with the water vapor as well, which leads to the formation of the $Ni(OH)_2$ phase enabling a fast longitudinal growth of $W_5O_{14}$ crystals. The oxygen deficiency of the crystals, regarding $WO_3$, results from the reducing reaction of the gases $H_2S$ and $H_2$ respectively, generated during the reaction. In the immediate vicinity of nickel were generated rodlike and threadlike $W_5O_{14}$ crystals having a high phase homogeneity and high anisotropy.

Structural and Chemical Analysis

1. X-ray diffraction (Table 1)

Collected rodlike and threadlike crystals were inserted into a fine glass capillary tube having an inner diameter of approximately 0.2 mm, and exposed to X-ray irradiation. From Table 1 is evident a very good correspondence of the measured spacings between the crystallographic planes, with the data found in the sole reference table for the compound $W_5O_{14}$: JCPDS (International Centre for Diffraction data), No. 71-0292, reference (I. J. McColm, R. Steadman, and S. J. Wilson, J. Solid State Chem. 23, 33 (1978). The indexing was chosen in conformance with the tetragonal basic cell having the parameters: a=2.333 nm, c=0.3797 $nm^1$.

TABLE 1

Comparison of spacings between crystallographic planes. The first column represents experimentally measured values of spacings between the planes, the second column represents relative intensities of the measured diffraction peaks, the third and fourth column represent comparative values taken from JCPDS tables, and the last three columns represent the indexing in conformance with a tetragonal basic cell having the parameters: a = 2.333 nm, c = 0.3797 nm. (VW—very weak, W—weak, S—strong, VS—very strong).

| $d_{exp}$ (nm) ± 0.0005 nm | Int. (%) | d (nm)[*] | Int. (%) | h | k | l |
|---|---|---|---|---|---|---|
| 1.1624 | VW | 1.1665 | 22.9 | 2 | 0 | 0 |
| 1.0375 | VW | 1.0433 | 14.4 | 2 | 1 | 0 |
| 0.735 | VW | 0.73775 | 8.6 | 3 | 1 | 0 |
| 0.6149 | VW | 0.64705 | 0.9 | 3 | 2 | 0 |
| 0.5641 | VW | 0.56583 | 0.7 | 4 | 1 | 0 |
| 0.4524 | VW | 0.45753 | 2.1 | 5 | 1 | 0 |
| 0.4184 | S | 0.41242 | 2 | 4 | 4 | 0 |
| 0.3993 | VW | 4.001 | 1.6 | 5 | 3 | 0 |
| 0.3788 | VS | 0.3797 | 100 | 0 | 0 | 1 |
| 0.3639 | VS | 0.36435 | 57.5 | 5 | 4 | 0 |
| 0.3476 | VW | 0.34778 | 13.1 | 6 | 3 | 0 |
| 0.3248 | VW | 0.32352 | 16.1 | 6 | 4 | 0 |
| 0.3117 | VW | 0.31245 | 3.5 | 3 | 3 | 1 |
| 0.2892 | S | 0.28937 | 39.5 | 8 | 1 | 0 |
| 0.2731 | S | 0.27166 | 16.3 | 6 | 0 | 1 |
| 0.2628 | S | 0.26289 | 31.8 | 5 | 4 | 1 |
| 0.2559 | VW | 0.25646 | 7.7 | 6 | 3 | 1 |
| 0.2459 | VW | 0.24625 | 9.2 | 9 | 3 | 0 |
| 0.2296 | W | 0.23015 | 28 | 8 | 1 | 1 |
| 0.1893 | VW | 0.18985 | 14.1 | 0 | 0 | 2 |

[*]Y. B. Li, Y. Bando, D. Goldberg, Adv. Mater. 15, 1294 (2003)

2. Scanning electron microscopy (FIG. 2)

FIG. 2a,b represents a scanning electron microscope image of $W_5O_{14}$ crystals grown on a $WS_2$ substrate. Images of rodlike and threadlike crystals having average diameters of 100 nm, and lengths of several hundred micrometers, were taken without additional metal spraying for electrical conductivity enhancement, which proves their good electrical conductivity and good electrical contact with the substrate $WS_2$.

3. High-resolution transmission electron microscopy—microscope type 200 keV Jeol TEM 2010F (FIG. 3)

FIG. 3 represents a high-resolution electron microscope image of a $W_5O_{14}$ crystal. On FIG. 3a are evident atomic planes (001), which are at right-angle to the longitudinal direction of the fiber. The measured interplanar spacing was 3.64 (1±0.05) Å, which is correlating within error range with the interlattice spacing (001)—3.797 Å of the compound $W_5O_{14}$—JCPDS (International Centre for Diffraction data), No. 71-0292, reference (I. J. McColm, R. Steadman, and S. J. Wilson, J. Solid State Chem. 23, 33 (1978). FIG. 3b represents planes (100) having interplanar spacings of 4 (1±0.03) Å, which is correlating within error range with the interlattice spacing (600) in Table JCPDS-71-0292—3.8883 Å. FIG. 3c represents [010] a zone of the $W_5O_{14}$ crystal with the marked basic cell, correlating for the plane (010) with data from Table JCPDS-71-0292: a=23.33 Å, c=3.797 Å.

4. Transmission electron diffraction—microscope type 200 keV Jeol TEM 2010F (FIG. 4)

FIG. 4 represents the electron diffraction on a $W_5O_{14}$ crystal. The direction of the electron beam is parallel to the crystal direction [010]. The direction [001] was parallel to the longitudinal direction of the fiber, whereas, the direction [100] was at right-angle to the direction of the fiber. The relative intensities of the diffraction reflexes from planes (200), (400), (600) in (800), are in correspondence with relative intensities in Table JCPDS-71-0292. For example: the highest intensity belongs to the reflex from planes (600), corresponding to the size of the basic cell in direction [100]. The intensities of reflexes from planes (200) in (400) are substantially lower, which is in correspondence with the aforesaid Table. The only comparable intensity shows the reflex belonging to the scattering on planes (600), which is again in correspondence with Table JCPDS-71-0292. The diffraction image shows, unequivocally, that the crystal appertains to the $W_5O_{14}$ compound. The eventual presence of nickel is not discernible in the structure. Therefore it can neither be maintained for certain that nickel is incorporated in the crystals, nor that it is non-existent in the crystals.

Time Resistance and Reproducibility of the Synthesis

The $W_5O_{14}$ compound is resistant in the air at room conditions. The resistance of the compound and the reproducibility of the synthesis were controlled by means of transmission electron diffraction.

Summary of the Two Synthesis Methods

In both processes, to say in the chemical transport reaction in a closed quartz ampoule, and in the reaction in a through-flow reaction vessel, the presence of nickel was prerequisite for the growth of the $W_5O_{14}$ phase. In the absence of nickel, no growth of the $W_5O_{14}$ phase occurs, since a shift of the chemical balance in favor of the outmost reduced tungsten oxide $W_{18}O_{49}$ takes place. Additional prerequisites, which have to be fulfilled for the growth of the $W_5O_{14}$ phase, are as follows: a) growth from vapor phase—sufficiently high temperature, at least over 600° C., b) presence of water in a volume ratio of 0.005% to 0.1% with respect to the volume of the quartz ampoule, or the amount of water drawn into the open reaction vessel by the nitrogen humidified at room temperature.

The procedure for the synthesis of threadlike tungsten oxide $W_5O_{14}$ by means of a chemical transport reaction in a closed quartz ampoule, or by means of a reaction in a through-flow reaction vessel, according to the present invention, is characterized in that the synthesis is performed from the vapor phase, wherein tungsten takes part in the reaction as a pure phase or via $WS_{2\pm x}$, $x \approx 4$, previously synthesized from the elements; and/or the source of tungsten may be also tungsten oxides $WO_{3-y}$, $0 \leq y \leq 1$, and nickel may enter the reaction via $NiI_2$, $Ni(OH)_2$ and/or atomic nickel. The growth of the $W_5O_{14}$ phase is ensured at a temperature of 600° C., in the presence of water in a volume ratio of 0.005% to 0.1% with respect to the volume of the quartz ampoule, or the amount of water, drawn into the through-flow reaction vessel by nitrogen humidified at room temperature. Nickel may be incorporated in $W_5O_{14}$ crystals, or it may play only the role of a catalyst in their growth.

What is claimed is:

1. A process for synthesizing a rodlike or threadlike tungsten oxide comprising $W_5O_{14}$, the process comprising:
   (a) providing a tungsten source and a nickel source to a closed vessel;
   (b) effecting a vapor phase transport of the tungsten source or the tungsten source and the nickel source; and
   (c) synthesizing the rodlike or threadlike tungsten oxide comprising $W_5O_{14}$;
   wherein the tungsten source comprises any one of:
      (i) pure tungsten,
      (ii) substantially stoichiometric $WS_2$,
      (iii) tungsten oxides $WO_{3-Y}$, $0 \leq Y \leq 1$, or
      (iv) combinations thereof; and
   wherein the nickel source comprises any one of:
      (i) $NiI_2$,
      (ii) $Ni(OH)_2$,
      (iii) elemental nickel, or
      (iv) combinations thereof.

2. The process according to claim 1 wherein the effecting comprises heating at least a portion of the vessel to a temperature ranging from 600° C. to 1000° C.

3. The process according to claim 1 further comprising providing water to the closed vessel in a volume ratio of 0.005% to 0.1% relative to the volume of the vessel.

4. The process according to claim 1 wherein the synthesizing comprises incorporating nickel in the rodlike or threadlike tungsten oxide.

5. The process according to claim 1 wherein nickel is a growth catalyst for the rodlike or threadlike tungsten oxide.

6. The process according to claim 1 wherein the rodlike or threadlike tungsten oxide comprises spacings substantially as presented in Table 1.

7. The process according to claim 1 wherein the rodlike or threadlike tungsten oxide comprises an electrically conductive tungsten oxide.

8. The process according to claim 1 wherein the effecting comprises effecting a vapor phase transport of the tungsten source and the nickel source.

9. A process for synthesizing a rodlike or threadlike tungsten oxide comprising $W_5O_{14}$, the process comprising:
   (a) providing a tungsten source and a nickel source to a through-flow reaction vessel;
   (b) effecting a vapor phase transport of the tungsten source or the tungsten source and the nickel source; and
   (c) synthesizing the rodlike or threadlike tungsten oxide comprising $W_5O_{14}$;
   wherein the tungsten source comprises any one of:
      (i) pure tungsten,
      (ii) substantially stoichiometric $WS_2$,
      (iii) tungsten oxides $WO_{3-Y}$, $0 \leq Y \leq 1$, or
      (iv) combinations thereof; and
   wherein the nickel source comprises any one of:
      (i) $NiI_2$,
      (ii) $Ni(OH)_2$,
      (iii) elemental nickel, or
      (iv) combinations thereof.

10. The process according to claim 9 wherein the effecting comprises heating at least a portion of the vessel to a temperature ranging from 600° C. to 1000° C.

11. The process according to claim 10 further comprising providing a water humidified gas to the through-flow reaction vessel.

12. The process according to claim 11 wherein the water humidified gas comprises a gas humidified at room temperature to a volume ratio of 0.005% to 0.1% relative to the gas.

13. The process according to claim 12 wherein the gas comprises nitrogen.

14. The process according to claim 9 further comprising incorporating nickel in the rodlike or threadlike tungsten oxide.

15. The process according to claim 9 wherein nickel is a growth catalyst for the rodlike or threadlike tungsten oxide.

16. The process according to claim 9 wherein the rodlike or threadlike tungsten oxide comprises spacings substantially as presented in Table 1.

17. The process according to claim 9 wherein the rodlike or threadlike tungsten oxide comprises an electrically conductive tungsten oxide.

18. The process according to claim 9 wherein the effecting comprises effecting a vapor phase transport of the tungsten source and the nickel source.

* * * * *

UNITED STATES PATENT AND TRADEMARK OFFICE
CERTIFICATE OF CORRECTION

| | | |
|---|---|---|
| PATENT NO. | : 8,496,907 B2 | |
| APPLICATION NO. | : 12/528162 | |
| DATED | : July 30, 2013 | |
| INVENTOR(S) | : Remskar et al. | |

It is certified that error appears in the above-identified patent and that said Letters Patent is hereby corrected as shown below:

On the Title Page

In the Abstract, Line 12, "$x \approx 4$" should be -- $x \approx 0$ --

In the Specification

In Column 2, Line 39, "$x \approx 4$" should be -- $x \approx 0$ --

In Column 7, Line 1, "$x \approx 4$" should be -- $x \approx 0$ --

Signed and Sealed this
Fourteenth Day of October, 2014

Michelle K. Lee
*Deputy Director of the United States Patent and Trademark Office*